United States Patent
Ogawa

(10) Patent No.: US 9,935,565 B2
(45) Date of Patent: Apr. 3, 2018

(54) MOTOR CONTROL CIRCUIT AND METHOD

(71) Applicant: Semiconductor Components Industries, LLC, Phoenix, AZ (US)

(72) Inventor: Takashi Ogawa, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 383 days.

(21) Appl. No.: 14/579,163

(22) Filed: Dec. 22, 2014

(65) Prior Publication Data

US 2015/0180390 A1    Jun. 25, 2015

Related U.S. Application Data

(60) Provisional application No. 61/918,693, filed on Dec. 20, 2013.

(51) Int. Cl.
*H02P 6/18* (2016.01)
*H02P 1/02* (2006.01)
(Continued)

(52) U.S. Cl.
CPC .......... *H02P 1/02* (2013.01); *H02P 6/085* (2013.01); *H02P 6/17* (2016.02); *H02P 6/182* (2013.01); *H02P 6/20* (2013.01); *H02P 27/085* (2013.01)

(58) Field of Classification Search
CPC .......... H02M 3/157; H02M 3/33515; H02M 3/3376; H02M 2001/0032;
(Continued)

(56) References Cited

U.S. PATENT DOCUMENTS 6,014,003 A * 1/2000 French .............. H02P 9/40
318/254.2
6,359,406 B1   3/2002 Chiu et al.
(Continued)

FOREIGN PATENT DOCUMENTS

JP    2006-299810 A    11/2006
JP    2008-43166 A    2/2008
(Continued)

OTHER PUBLICATIONS

Application Note AN44140A by Panasonic, Sine-wave PWM drive system and rotor position detection method by 1-Hall-sensor, 1-Hall-Sensor Driver IC for 3-phase Brushless Motor; Doc No. TA4-EA-06180; Established Apr. 19, 2013; Revised Nov. 21, 2013.
(Continued)

*Primary Examiner* — Marlon Fletcher
(74) *Attorney, Agent, or Firm* — Rennie William Dover

(57) ABSTRACT

In accordance with an embodiment, motor control circuit has a first selector connected to a second selector through an analog to digital converter. The first selector has an input that is connected to an external pin. In addition, the second selector has a plurality of inputs and a plurality of outputs, wherein a first register is connected to a first input and a second register is connected to a second output of the second selector. In accordance with another embodiment, at a beginning step of a method for setting a duty of a drive signal of a motor, a duty setting signal is applied to an external pin. The duty setting signal is converted into a digital duty setting signal. One of the digital duty setting signal or a predetermined duty signal is transmitted to a storage register.

10 Claims, 5 Drawing Sheets

(51) Int. Cl.
*H02P 6/182* (2016.01)
*H02P 6/20* (2016.01)
*H02P 27/08* (2006.01)
*H02P 6/08* (2016.01)
*H02P 6/17* (2016.01)

(58) Field of Classification Search
CPC .... H02M 7/53875; G06F 3/0608; H02P 6/16; H02P 6/28; H02P 7/29; H02P 27/08; H02P 3/08; H02P 29/00; H02P 2203/09; H02P 27/085; H02P 7/281
See application file for complete search history.

(56) References Cited

U.S. PATENT DOCUMENTS

| | | | |
|---|---|---|---|
| 6,483,270 B1 | 11/2002 | Miyazaki et al. | |
| 8,476,852 B2 * | 7/2013 | Hawker | H02P 6/14 318/254.1 |
| 8,729,839 B2 * | 5/2014 | Suzuki | H02P 6/22 318/400.03 |
| 2002/0027423 A1 | 3/2002 | White | H02P 6/08 318/400.23 |
| 2004/0095117 A1 * | 5/2004 | Kernahan | H02M 3/157 323/282 |
| 2010/0256782 A1 * | 10/2010 | Dai | H02P 6/14 700/14 |
| 2011/0254487 A1 * | 10/2011 | Clothier | H02P 6/14 318/400.14 |
| 2013/0221880 A1 | 8/2013 | Sekihara | |
| 2014/0340009 A1 * | 11/2014 | Reynolds | H02P 6/205 318/400.11 |
| 2015/0326153 A1 * | 11/2015 | Gohara | H02P 6/002 318/400.2 |
| 2016/0013742 A1 * | 1/2016 | Gohara | H02H 7/085 318/461 |
| 2016/0241172 A1 * | 8/2016 | Leman | H02P 6/08 |

FOREIGN PATENT DOCUMENTS

| | | |
|---|---|---|
| JP | 4662729 B2 | 3/2011 |
| JP | 2012-105406 A | 5/2012 |
| JP | 2012-222950 A | 11/2012 |
| JP | 2013-31273 A | 2/2013 |
| JP | 2013-81320 A | 5/2013 |
| JP | 2013-183478 A | 9/2013 |

OTHER PUBLICATIONS

Application Note LV8804FV from ON Semiconductor, Bi-CMOS LSI PC and Server Fan Motor Driver Application Note, pp. 1-29, Dec. 2013, Semiconductor Components Industries, LLC, http://onsemi.com.

Datasheet No. BD63241FV from ROHM Semiconductor, DC Brushless Motor Drivers Three Phase 1 Hall Full-Sine Fan Motor Driver, pp. 1-15, 2013, TSZ22111-14-001, www.rohm.com.

Datasheet LV11961HA from ON Semiconductor, Bi-CMOS LSI for Brushless Motor Drive Sine Wave PWM Drive, Pre driver IC, pp. 1-14, Oct. 2014, Rev. 1, Publication Order No. LA11961HA/D, Semiconductor Components Industries, LLC, http://onsemi.com.

Datasheet LV8139JA from ON Semiconductor, Bi-CMOS LSI Single-phase Fan Motor Driver, pp. 1-18, May 2013, Ordering No. ENA2154, Semiconductor Components Industries, LLC, http://onsemi.com.

* cited by examiner

MOTOR CONTROL CIRCUIT AND METHOD

BACKGROUND

The present invention relates, in general, to motors and, more particularly, to three phase motors.

Multi-phase motors are used in a variety of applications including disc drives, digital video disc players, scanners, printers, plotters, actuators used in the automotive and aviation industries, etc. Generally, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element. U.S. Pat. No. 6,359,406 issued to Hsien-Lin Chiu et al. on Mar. 19, 2002, discloses three-phase motors and in particular discloses a three-phase motor having two Hall sensors or two Hall elements. A drawback with this technology is that it uses special bias circuitry that complicates its design and increases costs. A technique to lower the cost of three-phase motors is to manufacture the motor drive circuitry as a sensor-less motor drive circuitry, i.e., a motor without sensors. U.S. Pat. No. 6,570,351 issued to Shinichi Miyazaki et al. on May 27, 2003, discloses a three-phase motor without sensors. A drawback with sensor-less motor drive configurations is that they may fail to start if the inductive voltage of the coil is small. In addition, a motor may fail to start if the duty is too low and the threshold duty varies from motor to motor.

Accordingly, it would be advantageous to have a multi-phase motor drive circuit and a method for driving the motor that is not overly complex and that can handle small inductive coil voltages. It is desirable for the multi-phase drive circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
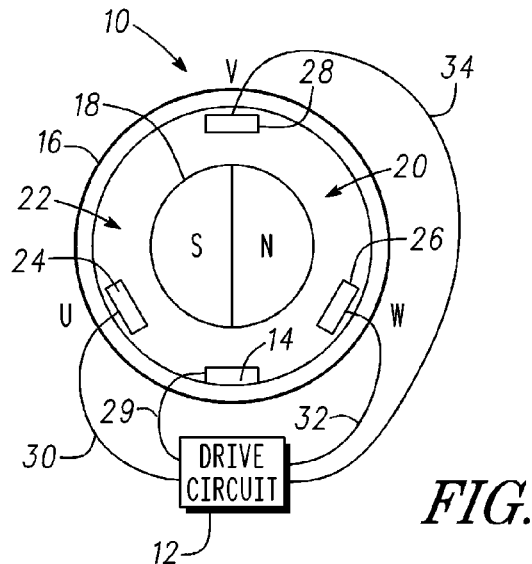
FIG. 1 is a diagrammatic representation of a motor that is driven by a drive circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten per cent (10%) (and up to twenty per cent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally, the present invention provides a circuit and a method for setting a minimum Pulse Width Modulation ("PWM") range to disable three-phase motor 10 such that motor 10 does not work, i.e., a minimum PWM signal range is predetermined to stop motor 10 from operating in response to a PWM signal being below the predetermined range. The acceptable minimum range for the PWM signal may vary depending on the manufacturer of a motor. Because of the variance in the acceptable minimum PWM range, the value of PWM might be too high or too low for certain motors. In accordance with embodiments of the present invention, the minimum PWM signal range may be adjusted using an external pin connected to circuitry having a fixed hysteresis value, e.g., 5%.

In accordance with another embodiment of the present invention, an integrated circuit ("IC") is configured to be able to increase the output PWM range up to a pre-determined value at motor start-up, wherein the IC has an external terminal or pin that changes the predetermined value in accordance with a voltage set on the external terminal. The pre-determined value has a default value which can be set by applying a voltage of zero volts or a regulator voltage Vreg to the external terminal. In using the default value, the external terminal or external pin is not limited to being supplied from a resistor.

In accordance with another embodiment, a motor control circuit, includes a first selector having a first input connected to a first input pin and an output connected to an analog-to-digital converter. A second selector has a first input connected to a first register, a second input connected to a second register, a third input connected to a third register, a fourth input connected to an output of the analog-to-digital converter, and a first output connected to a fourth register, a second output coupled to a fifth register, and a third output coupled to a third register. An analog-to-digital converter control circuit has an output connected the first selector, to the analog-to-digital converter controller, and to the first selector.

In accordance with an aspect, the motor control circuit further includes a pulse width module protection circuit that comprises a first counter having an input connected for receiving a pulse width modulation signal and to an input duty calculation circuit. A speed setting circuit has a first input connected to the second output of the first counter and a second input coupled for receiving a value from the third register of the second selector. A speed judgment circuit has a first input coupled to the output of the input duty calculation circuit and a second input coupled to the output of the speed setting circuit.

In accordance with another aspect, a state controller is included that is connected to the speed judgment circuit.

In accordance with another aspect, a third register is connected to the second selector wherein the signal from the third input pin is transmitted to the third register.

In accordance with another aspect, a duty controller is included having a second counter, a comparator, and a summer, and a shift register, wherein the shift register is connected to the summer.

In accordance with another embodiment, a method for setting a duty of a drive signal of a motor is provided that comprises applying a duty setting signal to an external pin; converting the duty setting signal into a digital duty setting signal; and transmitting one of the digital duty setting signal or a predetermined duty signal to a storage register.

In accordance with another aspect, a direct current signal, such as, for example, a voltage is applied to the external pin.

In accordance with another aspect, transmitting one of the digital duty setting signal or the predetermined duty signal to the storage register includes: comparing the digital duty setting signal with the predetermined duty signal; and selecting the digital duty setting signal to be transmitted to the storage register in response to the predetermined duty signal being greater than the digital duty setting signal.

In accordance with another aspect converting the duty setting signal into a digital duty setting signal in response to a control signal from an analog to digital control circuit.

In accordance with another aspect, including a control signal is generated in response to comparing a value from the storage register with a value from a counter that is indicative of an input pulse width modulation signal and using the control signal to control a summer.

In accordance with another embodiment, a method for generating a drive signal having a duty is provided that includes providing a duty determination circuit having an input coupled to an external pin, the duty determination circuit comprising a first selector having an input coupled to the external pin, an analog to digital converter having an input coupled to the first selector, an analog to digital converter control circuit having a first output coupled to the selector and to the analog to digital converter, a second selector having a first input coupled to the output of the analog to digital converter, a second input coupled to a second output of the analog to digital converter control circuit, a third input coupled to a first register, and a first output coupled to a second register. A duty setting signal is received at the external pin and converted to a digital duty setting signal. The digital duty setting signal or a valued of the first register is transmitted to the second register.

In accordance with as aspect, one of the digital duty setting signal or the value of the first register is transmitted to the second register in response to the value of the first register being greater than the digital duty setting signal.

FIG. 1 is a diagrammatic representation of a three-phase motor 10 that is driven by a drive circuit 12 in response to one or more signals from a Hall sensor 14 in accordance with an embodiment of the present invention. Drive circuit 12 may be referred to as a driver and Hall sensor 14 may be referred to as a Hall element. Three-phase motor 10 includes a stator 16 and a rotor 18 having a portion 20 magnetized with a first pole and a portion 22 magnetized with a second pole. By way of example, portion 20 is a north pole and portion 22 is a south pole. A U-phase winding 24 is coupled to or mounted on a portion of stator 16, a W-phase winding 26 is coupled to or mounted on another portion of stator 16, and a V-phase winding 28 is coupled to or mounted on yet another portion of stator 16. Drive circuit 12 is coupled to Hall sensor 14 via an electrical interconnect 29, to U-phase winding 24 via an electrical interconnect 30, to W-phase winding 26 via an electrical interconnect 32, and to V-phase winding 28 through an electrical interconnect 32. Electrical interconnects 30, 32, and 34 may be wires, electrically conductive traces, or the like.

Figure 2:
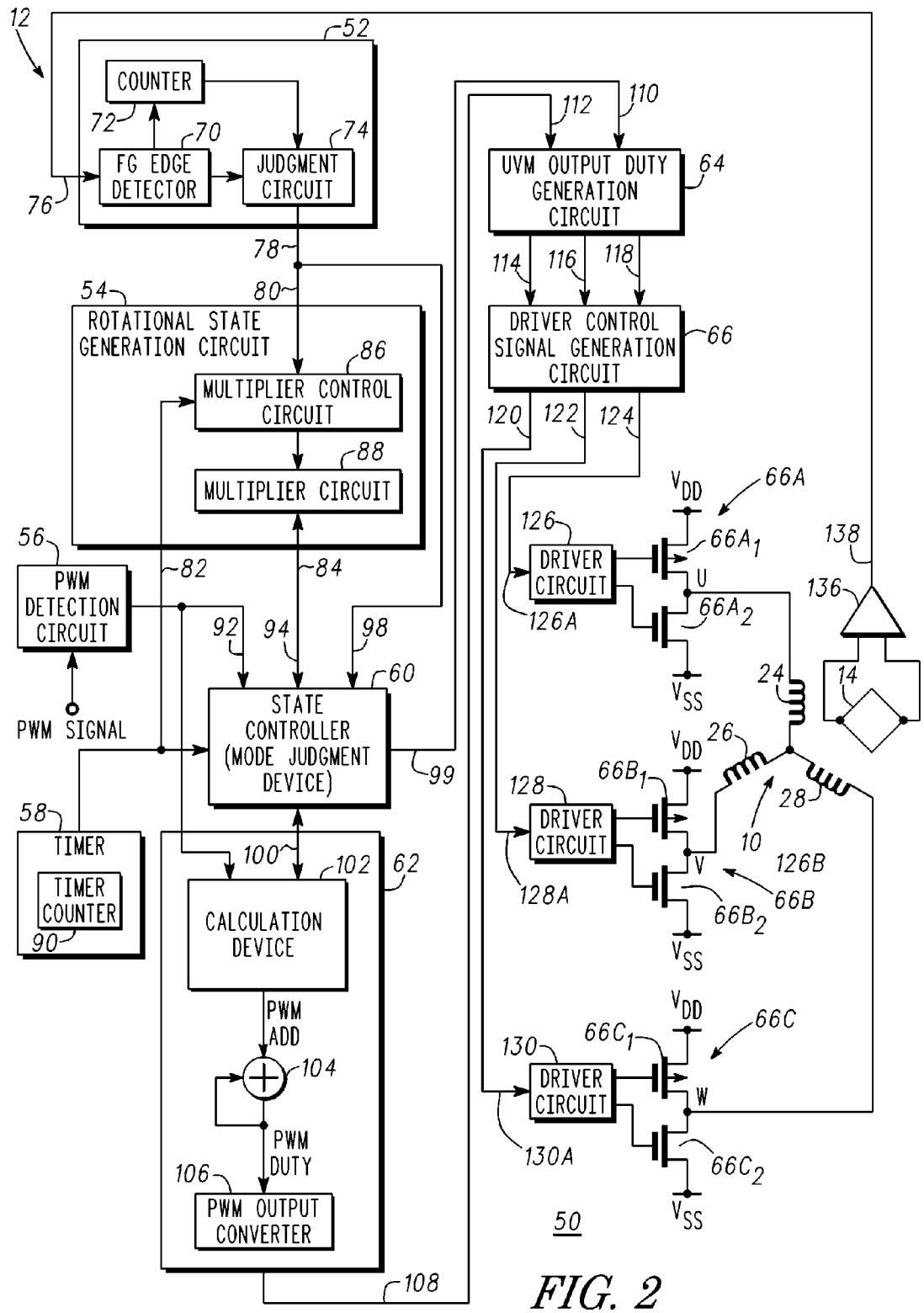
FIG. 2 is a block diagram further illustrating the drive circuit of FIG. 1.

FIG. 2 is a block diagram 50 further illustrating drive circuit 12. It should be noted that block diagram 50 includes diagrammatic representations of drive circuit 12, three-phase motor 10, and Hall sensor 14. Drive circuit 12 includes an FG signal masking circuit 52, a rotational state generation circuit 54, a pulse width modulation ("PWM") detection circuit 56, a timer 58, a state controller 60, a duty control controller 62, an output duty generation circuit 64, a drive control signal generation circuit 66, and an output drive stage 68. More particularly, FG signal masking circuit 52 may be comprised of an FG signal edge detector 70, a counter 72, and an FG signal judgment circuit 74. FG signal edge detector 70 has an input that serves as an input 76 of drive circuit 12, an output connected to an input of counter 72 and an output connected to an input of FG signal judgment circuit 74. An output 78 of FG signal judgment circuit 74 serves as an output of FG signal masking circuit 52. FG signal masking circuit 52 may be referred to as a chattering mitigation circuit or a chattering mitigation feature.

Rotational state generation circuit 54 has inputs 80 and 82, an input/output 84, and may be referred to as an FG generation circuit. Output 78 of FG signal masking circuit 52 is connected to input 80 of FG generation circuit 54. Input/output 84 may be referred to as an input/output node, an I/O node, an input/output terminal, an I/O terminal, or the like. Rotational state generation circuit 54 may be comprised of a control circuit 86 coupled to a multiplier circuit 88. It should be noted that input 80 and input 84 are connected to multiplier control circuit 86 and input/output 84 is connected to multiplier circuit 88. PWM detection circuit 56 has an output connected to an input of state controller 60 and to an input of duty control controller 62 and is configured to determine the speed of rotor 18. It should be noted that if the duty range is small the speed of the rotor is smaller than if the duty range is large. Timer 58 has an output connected to input 82 of rotational state generation circuit 54 and to an input 92 of state controller 60 and may include a timer counter 90. In addition, state controller 60 has an input/output 94 connected to an input/output 84 of rotational state generation circuit 54, an input 98 connected to output 78 of FG signal masking circuit 52, and an input/output 96 connected to an input/output 100 of duty control controller 62. By way of example, duty control controller 62 is comprised of a calculation device 102 configured to determine an amount of change to the duty cycle, a summer 104, and a PWM converter 106. Calculation device 102 has an input that serves as input/output 100 and an output connected to an input of summer 104. In addition, summer 104 has an output that is connected to an input of PWM output converter 106 and to another input of summer 104. An output 108 of PWM output converter 106 serves as an output of duty control controller 62. State controller 60 is configured for determining the status or condition of the FG signal and the PWM signal and duty control controller 62 is configured to control an output sine wave, which helps to make the motor quieter.

Output duty generation circuit 64 has an input 110 connected to an output 99 of output of state controller 60, an input 112 connected to output 108 of output duty generation circuit 62, and a plurality of outputs 114, 116, and 118 connected to corresponding inputs of drive control signal generation circuit 66, which signal generation circuit 66 has a plurality of outputs 120, 122, and 124 connected to corresponding inputs of output drive stage 68. In accordance with an embodiment, drive stage 68 includes driver devices 126, 128, and 130 having inputs that serve as inputs 126A, 128A, and 130A of output drive stage 68, a pair 66A of transistors having a terminal connected to U-phase winding 24, a pair 66B of transistors having a terminal connected to W-phase winding 26, and a pair 66C of transistors having a terminal connected to V-phase winding 28. Pair of transistors 66A is comprised of transistors $66A_1$ and $66A_2$, wherein each transistor has a control electrode, and a pair of current carrying electrodes. The control electrodes of transistors $66A_1$ and $66A_2$ are coupled for receiving control signals from driver device 126, one current carrying electrode of transistor $66A_1$ is coupled for receiving a source of potential $V_{DD}$ and the other current carrying electrode of transistor $66A_1$ is connected to a current carrying electrode of transistor $66A_2$. The other current carrying terminal of transistor $66A_2$ is coupled for receiving a source of potential $V_{SS}$ such as, for example, a ground potential. The commonly connected current carrying electrodes of transistors $66A_1$ and $66A_2$ are connected to U-phase winding 24.

Pair of transistors 66B is comprised of transistors $66B_1$ and $66B_2$, wherein each transistor has a control electrode, and a pair of current carrying electrodes. The control electrodes of transistors $66B_1$ and $66B_2$ are coupled for receiving control signals from driver device 128, one current carrying electrode of transistor $66B_1$ is coupled for receiving a source of potential $V_{DD}$ and the other current carrying electrode of transistor $66B_1$ is connected to a current carrying electrode of transistor $66B_2$. The other current carrying terminal of transistor $66B_2$ is coupled for receiving a source of operating potential $V_{SS}$ such as, for example, a ground potential. The commonly connected current carrying electrodes of transistors $66B_1$ and $66B_2$ are connected to U-phase winding 26.

Pair of transistors 66C is comprised of transistors $66C_1$ and $66C_2$, wherein each transistor has a control electrode, and a pair of current carrying electrodes. The control electrodes of transistors $66C_1$ and $66C_2$ are coupled for receiving control signals from driver device 130, one current carrying electrode of transistor $66C_1$ is coupled for receiving a source of potential $V_{DD}$ and the other current carrying electrode of transistor $66C_1$ is connected to a current carrying electrode of transistor $66C_2$. The other current carrying terminal of transistor $66C_2$ is coupled for receiving a source of operating potential $V_{SS}$ such as, for example, a ground potential. The commonly connected current carrying electrodes of transistors $66C_1$ and $66C_2$ are connected to U-phase winding 28.

A comparator 136 has inputs connected to corresponding inputs of a Hall sensor 14 and an output 138 connected to input 76 of rotational state generation circuit 54.

It should be noted that in accordance with an alternative embodiment, FG signal masking circuit 52 is absent from drive circuit 12 and that output 138 of comparator 136 is commonly connected to input 76 of rotational state generation circuit 54 and to input 98 of state controller 60.

Figure 3:
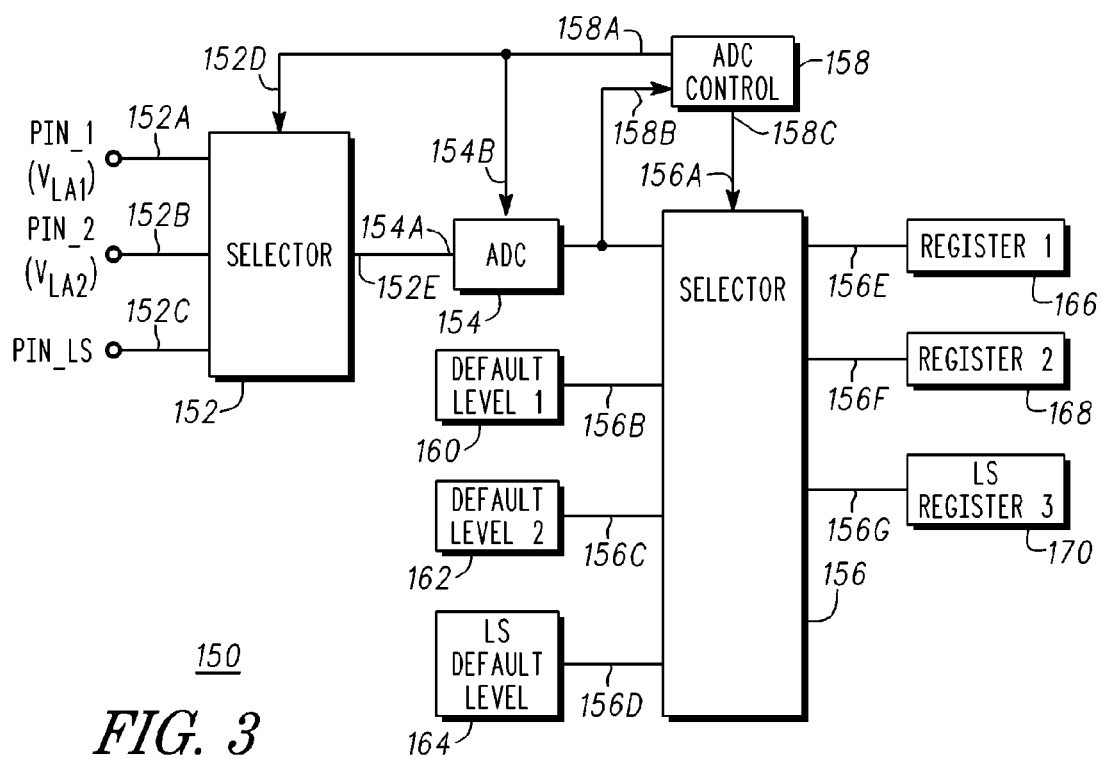
FIG. 3 is a circuit schematic of a portion of the drive circuit of FIG. 1 in accordance with another embodiment of the present invention.

FIG. 3 is a block diagram of a duty determination circuit 150 which may be a circuit block within PWM detection circuit 56 in accordance with an embodiment of the present invention. What is shown in FIG. 3 is a selector 152, an analog-to-digital converter ("ADC") 154, a selector 156, an ADC control circuit 158, and a plurality of registers 160, 162, and 164 coupled to corresponding inputs of selector 158, and a plurality of registers 166, 168, and 170 coupled to corresponding outputs of selector 158. More particularly, selector 152 has inputs 152A, 152B, and 152C that are coupled for receiving PWM signals from three-phase motor 10, an input 152D connected to an output 158A of ADC control circuit 158. ADC 154 has an input 154A connected to an output 152E and an input 154B connected to output 158A of ADC control circuit 158. Input 152A is coupled to or, alternatively serves as, a first advanced angle pin, Pin_1, input 152B is coupled to or, alternatively serves as, a second advanced angle pin, Pin_2, and input 152C is coupled to or, alternatively serves as, a lowest speed PWM setting pin, Pin_LS. Selector 156 has an input 156A connected to an output 158C of ADC control circuit 158, an input 156B connected to an input register 160, an input 156C connected to an input register 162, an input 156D connected to an input register 164, an output 156E connected to an output register 166, an output 156F connected to an output register 168, and an output register 156G connected to an output register 170.

Figure 4:
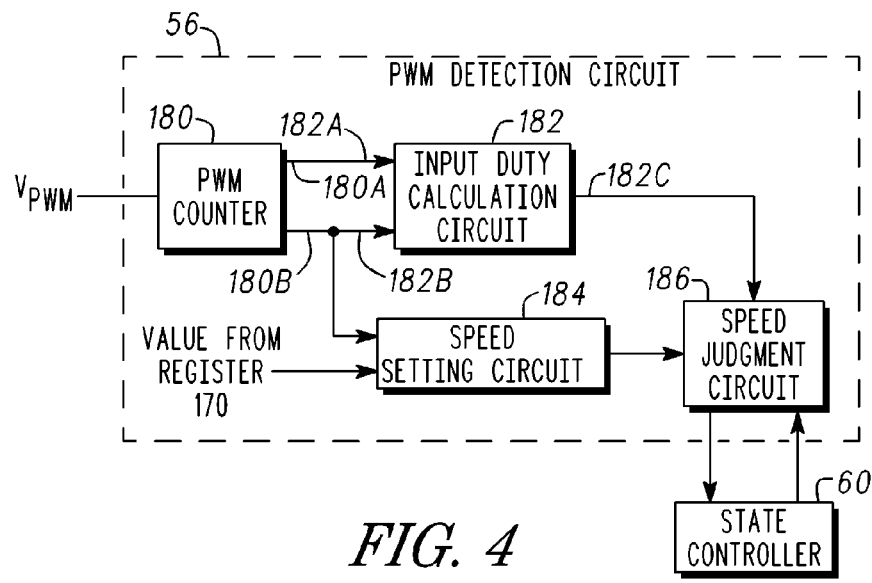
FIG. 4 is a circuit schematic of a portion of the drive circuit of FIG. 1 in accordance with another embodiment of the present invention.

FIG. 4 illustrates additional features of PWM detection circuit 56, and duty control controller 62 are shown. PWM detection circuit 56 includes a PWM counter 180 connected to an input duty calculation circuit 182, wherein input duty calculation circuit 182 has inputs 182A and 182B connected to outputs 180A and 180B of PWM counter 180, respectively. Duty control controller 62 is comprised of a speed setting circuit 184 connected to a speed judgment circuit 186, wherein speed setting circuit 184 may be configured to set the lowest-speed of rotor 18 and speed judgment circuit 186 may be configured to determine the lowest speed of rotor 18. Speed setting circuit 184 has an input commonly connected to output 180B of PWM counter 180 and to input 182B of input duty calculation circuit 182. Speed setting circuit 184 further includes an input coupled for receiving a lowest-speed set point $V_{LSP}$ from register 170. Speed judgment circuit 186 has an input connected to the output of speed setting circuit 184, an input connected to output 182C of input duty calculation circuit 182, an input connected to state controller 60 and an output connected to stage controller 60.

Figure 5:
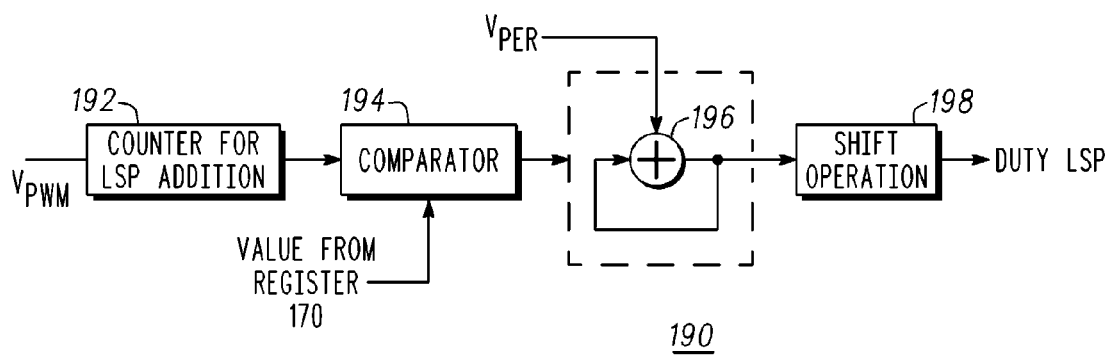
FIG. 5 is a circuit schematic of a portion of the drive circuit of FIG. 1 in accordance with another embodiment of the present invention.

FIG. 5 is a block diagram 190 of a portion of duty control controller 62 in accordance with an embodiment of the present invention. Duty control controller 62 includes a counter 192, a comparator 194, a summer 196, and a shift register 198. Comparator 194 has an input connected to an output of counter 192 and an input coupled for receiving the lowest speed set point $V_{LSP}$ from register 170. Summer 196 has an input coupled for receiving signal $V_{PER}$ that is indicative of the period of the PWM signal and an input coupled to the output of summer 196 in a feedback configuration. Summer 196 receives a control signal from comparator 194.

Figure 6:
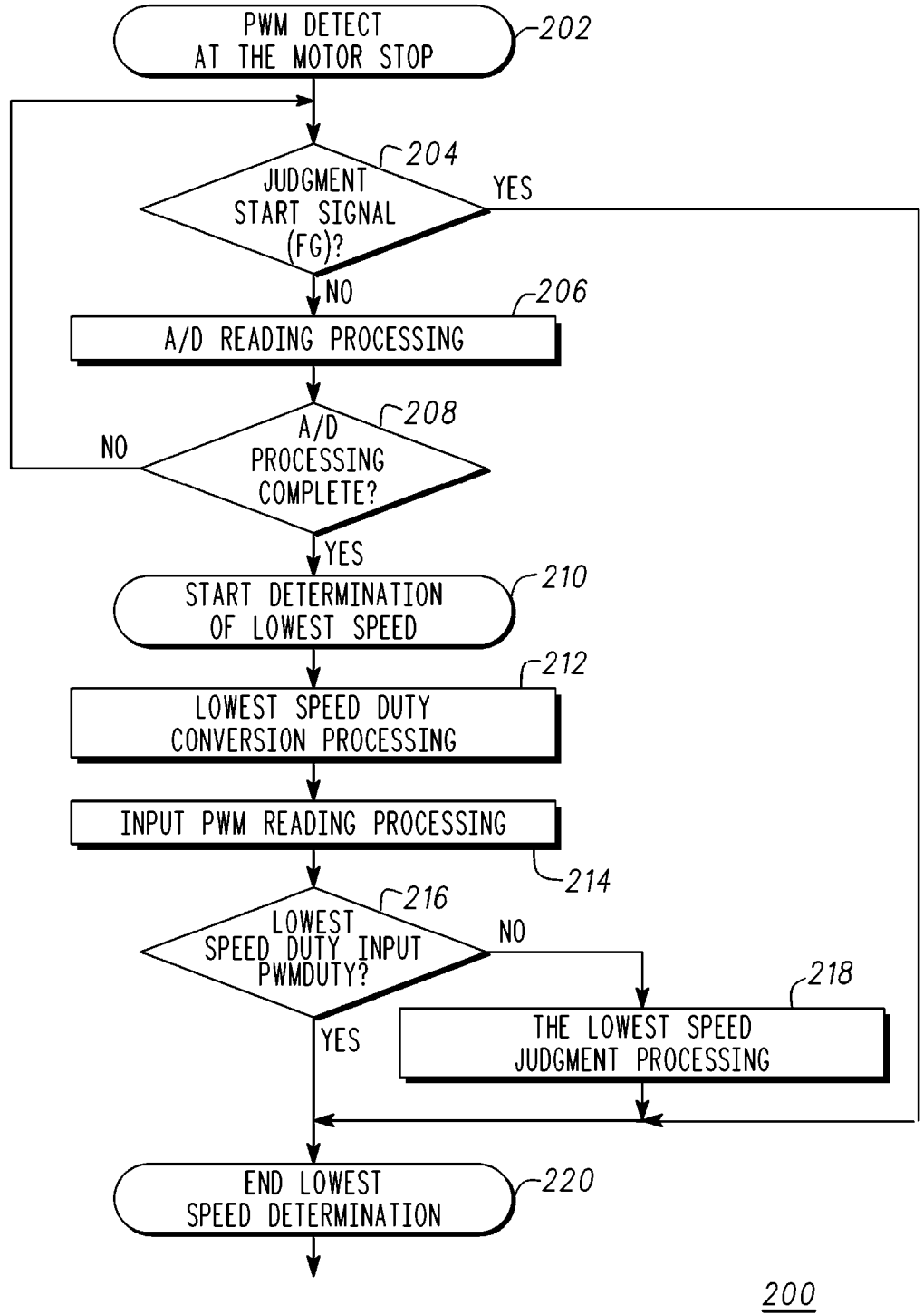
FIG. 6 is a flow diagram for adjusting a duty of a drive signal in accordance with another embodiment of the present invention.

FIG. 6 is a flow diagram 200 illustrating a method for setting a duty of a signal using an external pin. In operation PWM detection circuit 56 detects a PWM input signal at stoppage of three-phase motor 10, i.e., stoppage of rotor 18, as indicated by box 202 of flow diagram 200 and determines whether a start signal has been received. At decision diamond 204, if a start signal has been received (YES branch of decision diamond 204) detection circuit 56 determines the lowest speed of motor 10 as indicated by box 220. If the start signal has not been received, ADC 154 of duty determination circuit 150 begins reading the analog signal from three-phase motor 10 (indicated by box 206) and continues reading the analog signal if the analog to digital processing is not complete (indicated by the NO branch of decision diamond 208) If the analog to digital processing is complete (indicated by the YES branch of decision diamond 208), PWM detection circuit 56 begins determining the lowest speed (indicated by box 200). Briefly referring to FIG. 3, selector 152 is configured so that advance angle pins Pin_1, Pin_2, and lowest speed PWM setting pin, Pin_LS are read in response to selector 152 activating inputs 152A, 152B, and 152C, respectively. It should be noted that ADC control circuit 158 generates an enable signal at input 154B, wherein the enable signal changes from a first state to a second state such as, for example changing from a low logic state to a high logic state in response to the PWM signal changing from the first state to the second state causing ADC 154 to begin converting the analog signals received from pins Pin_1, Pin_2, and Pin_LSIn to digital signals. After completing the reading of the analog signals, determination of the lowest speed is started as indicated by box 210. After completing the reading of the analog signal by ADC 154, the value read from the external setting pin is converted to the lowest speed duty value as indicated by box 212. Box 214 indicates completion of reading the PWM duty. Then the lowest speed duty value and the input PWM duty value are compared as indicated by decision diamond 216. If the lowest speed duty is greater than the input PWM duty, the lowest speed determination process is completed as indicted by box 220. If the lowest speed duty is less than the input PWM duty, the lowest speed determination process continues as indicated by box 218. The process continues until the lowest speed duty is greater than the input PWM duty at which point the lowest speed determination process is complete as indicated by box 220.

Figure 7:
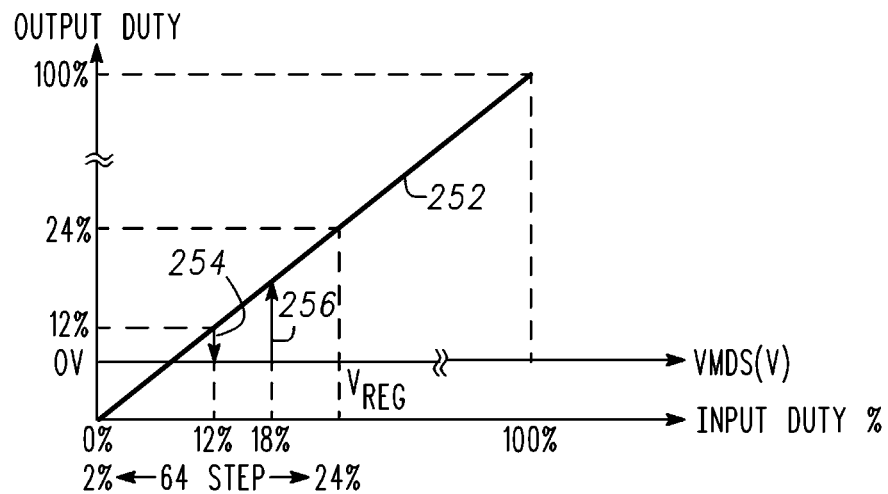
FIG. 7 is a plot of the output duty versus the input duty for enabling or disabling the duty cycle in response to a voltage set on an external pin in accordance with an embodiment of the present invention.

FIG. 7 is a plot 250 of the output duty (signal at terminal 108) versus the input duty (signal for enabling or disabling the duty cycle in response to a voltage set on pin PIN_LS at terminal 152C in accordance with an embodiment of the present invention. In addition, plot 250 illustrates the output duty versus the voltage (VMDS) applied to pin PIN_LS. In this embodiment, a voltage (VMDS) is applied to pin PIN_LS so that motor 10 is disabled in response to the duty being less than 12% and enabled in response to the duty being greater than 18%. In accordance with this embodiment, trace 252 of plot 250 illustrates that an enable duty equals the disable duty plus 6%, wherein the disable duty equals (24%)*(VMDS/$V_{REG}$). Hysteresis occurs between traces 254 and 256. Thus, the inclusion of pin PIN_LS allows setting the minimum duty of a motor. In addition, this allows setting the minimum duty for different motors, i.e., it is not limited to a single motor or a single type of motor.

Thus, duty determination circuit 150 can set the lowest duty hysteresis value using the external pin PIN_LS. The minimum duty value or lowest duty value can be determined by converting an analog signal at external pin PIN_LS to a digital value. After loading the minimum duty setting value, it can be compared with the duty of the input signal at the beginning of a startup sequence. The duty generated using the signal at external pin PIN_LS can be used to accommodate any frequency.

Figure 8:
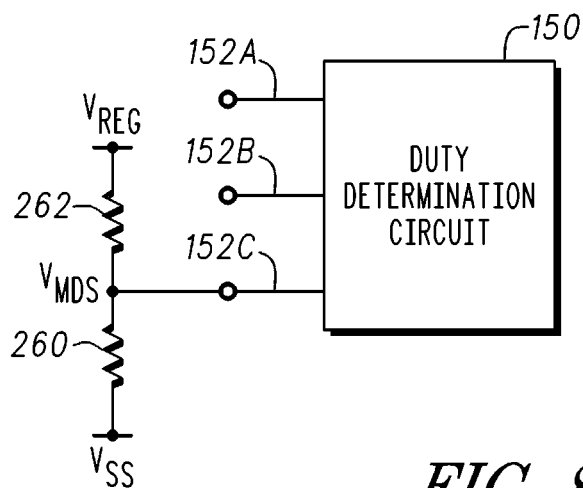
FIG. 8 is block diagram of duty determination circuit 150 having an external pin PIN_LS connected to a voltage divider network.

FIG. 8 is block diagram of duty determination circuit 150 having inputs 150A, 150B, and 150C, where input 150C is connected to pin PIN_LS or, alternatively serves as pint PIN_LS. A voltage divider network is connected to pin to pin PIN_LS, wherein the voltage divider network includes a resistor 260 having a terminal coupled for receiving a source of operating potential such as, for example, voltage $V_{SS}$ and an input coupled for receiving a source of operating potential $V_{REG}$, where voltage $V_{REG}$ is greater than voltage $V_{SS}$. By way of example voltage $V_{SS}$ is ground.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for setting a duty of a drive signal of a motor, comprising:
applying a duty setting signal to an external pin;
converting the duty setting signal into a digital duty setting signal; and
transmitting one of the digital duty setting signal or a predetermined duty signal to a storage register, wherein transmitting one of the digital duty setting signal or the predetermined duty signal to the storage register includes:
comparing the digital duty setting signal with the predetermined duty signal; and
selecting the digital duty setting signal to be transmitted to the storage register in response to the predetermined duty signal being greater than the digital duty setting signal.

2. The method of claim 1, wherein applying the duty setting signal to the external pin includes applying the duty setting signal as a direct current (DC) signal.

3. The method of claim 1, wherein applying the duty setting signal to the external pin includes using a voltage divider network to generate the voltage at the external pin.

4. The method of claim 1, further including converting the duty setting signal into a digital duty setting signal in response to a control signal from an analog to digital control circuit.

5. The method of claim 4, further including generating a control signal in response to comparing a value from the storage register with a value from a counter that is indicative of an input pulse width modulation signal and using the control signal to control a summer.

6. The method of claim 1, further including:
applying another duty setting signal to the external pin; and
converting the another duty setting signal into another digital duty setting signal in response to another predetermined duty signal being less than the digital duty setting signal.

7. A method for setting a duty of a drive signal of a motor, comprising:
applying a duty setting signal to an external pin;
converting the duty setting signal into a digital duty setting signal;
transmitting one of the digital duty setting signal or a predetermined duty signal to a storage register;
applying another duty setting signal to the external pin;
converting the another duty setting signal into another digital duty setting signal in response to response to another predetermined duty signal being less than the digital duty setting signal;
comparing the another digital duty setting signal with the another predetermined duty signal; and
selecting the another digital duty setting signal to be transmitted to the storage register in response to the predetermined duty signal being greater than the another digital duty setting signal.

8. A method for setting a duty of a drive signal of a motor, comprising:
applying a duty setting signal to an external pin;
converting the duty setting signal into a digital duty setting signal; and
transmitting one of the digital duty setting signal or a predetermined duty signal to a storage register, wherein transmitting one of the digital duty setting signal or the predetermined duty signal to the storage register includes:
generating a plurality of duty setting signals to the external pin;
converting each duty setting signal of the plurality of digital duty setting signals;
comparing each digital duty setting signal with the predetermined duty signal; and
selecting the digital duty setting signal to be transmitted to the storage register in response to the predetermined duty signal being greater than the digital duty setting signal.

9. The method of claim 8, further including storing the number of times the duty setting signal is compared with the predetermined duty signal.

10. The method of claim 9, further including using the number of times the duty setting signal is compared with the predetermined duty signal to generate a lowest speed duty level.

* * * * *